US011665301B2

(12) United States Patent
Kontani et al.

(10) Patent No.: US 11,665,301 B2
(45) Date of Patent: May 30, 2023

(54) TRANSPORT APPARATUS AND IMAGE FORMING APPARATUS

(71) Applicant: FUJIFILM Business Innovation Corp., Tokyo (JP)

(72) Inventors: Keita Kontani, Yokohama (JP); Yoji Nishida, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/394,921

(22) Filed: Aug. 5, 2021

(65) Prior Publication Data

US 2022/0263968 A1 Aug. 18, 2022

(30) Foreign Application Priority Data

Feb. 17, 2021 (JP) .............................. JP2021-023727

(51) Int. Cl.
*H04N 1/04* (2006.01)
*H04N 1/12* (2006.01)
*H04N 1/00* (2006.01)

(52) U.S. Cl.
CPC ....... *H04N 1/1215* (2013.01); *H04N 1/00795* (2013.01)

(58) Field of Classification Search
CPC .................... H04N 1/1215; H04N 1/00795
(Continued)

(56) References Cited

U.S. PATENT DOCUMENTS

2003/0007199 A1\* 1/2003 Ogata .................. H04N 1/2032
358/487
2013/0088762 A1\* 4/2013 Yamazaki ............ G03G 15/602
271/264
(Continued)

FOREIGN PATENT DOCUMENTS

JP 2013-081147 A 5/2013

OTHER PUBLICATIONS

Mar. 2, 2022 Extended Search Report issued in European Patent Application No. 21195632.1.

*Primary Examiner* — Cheukfan Lee
(74) *Attorney, Agent, or Firm* — Oliff PLC

(57) ABSTRACT

A transport apparatus includes: an apparatus body; an opening and closing unit attached to the apparatus body so as to be openable and closable between a closed position where an upper surface of the apparatus body is covered and an open position where the upper surface of the apparatus body is exposed, the opening and closing unit including, inside the opening and closing unit, a transport path along which a target material is transported; a transport path member that has a transport path surface constituting a part of the transport path, is rotatably supported by the opening and closing unit at one end portion side of the transport path member, and is configured such that the transport path is opened when the other end portion side of the transport path member moves downward from the opening and closing unit; and a hook portion that is rotatably attached to the other end portion side of the transport path member, is configured to hold the transport path member in a closed state of the transport path, in a hooked state in which the hook portion is hooked on a hooked portion of the opening and closing unit, based on a force applied toward a first rotation direction along which the hook portion is hooked to the hooked portion, and is configured to rotate in a second rotation (Continued)

direction opposite to the first rotation direction by coming into contact with the hooked portion while the transport path member is pushed upward by the upper surface of the apparatus body when the opening and closing unit is moved from the open position to the closed position in a non-hooked state in which the hook portion is not hooked on the hooked portion.

10 Claims, 13 Drawing Sheets

(58) Field of Classification Search
 USPC .................................... 358/498, 496, 401
 See application file for complete search history.

(56) References Cited

U.S. PATENT DOCUMENTS

| 2013/0089365 | A1 | 4/2013 | Yamazaki et al. |
| 2016/0142570 | A1* | 5/2016 | Cho .................... H04N 1/00591 |
| | | | 358/498 |
| 2019/0049891 | A1* | 2/2019 | Iikura ................ G03G 15/2017 |

* cited by examiner

TRANSPORT APPARATUS AND IMAGE FORMING APPARATUS

CROSS-REFERENCE TO RELATED APPLICATIONS

This application is based on and claims priority under 35 USC 119 from Japanese Patent Application No. 2021-023727 filed on Feb. 17, 2021.

BACKGROUND

Technical Field

The present invention relates to a transport apparatus and an image forming apparatus.

Related Art

JP-A-2013-81147 discloses an automatic document feeding apparatus including: a transport path member that has a transport path surface constituting a transport path along which a document is transported in an apparatus body, is rotatably supported by the apparatus body at one end portion side of the transport path member, and is configured such that the transport path is opened when the other end portion side of the transport path member is moved away from the apparatus body; a hook member that is attached to a rotation shaft provided on the other end portion side of the transport path member, and is configured to hold the transport path member in a closed state of the transport path by the hook member being biased in a first rotation direction along which the hook member is hooked to a hooked portion of the apparatus body, and being hooked to the hooked portion; and an operating member that is rotated, by own weight or a biased force, to an operation position in a second rotation direction opposite to the first rotation direction when the apparatus body is moved to an exposure position where the transport path member is exposed, and is attached to the rotation shaft with a space in a circumferential direction of the rotation shaft such that as the operating member is rotated toward the second rotation direction from the operation position, the hook member is rotated in the second rotation direction and separated from the hooked portion.

SUMMARY

As a transport apparatus, there is considered a transport apparatus including: an apparatus body; an opening and closing unit that is attached to the apparatus body so as to be openable and closable between a closed position where an upper surface of the apparatus body is covered and an open position where the upper surface of the apparatus body is exposed, and includes, inside the opening and closing unit, a transport path along which a target material is transported; and a transport path member that has a transport path surface constituting a part of the transport path, is rotatably supported by the opening and closing unit at one end portion side of the transport path member, and is configured such that the transport path is opened when the other end portion side of the transport path member is moved downward from the opening and closing unit.

As the transport apparatus, there is considered a transport apparatus including a hook portion that is rotatably attached to the other end portion side of the transport path member, is configured to hold the transport path member in a closed state of the transport path, in a hooked state in which the hook portion is hooked on a hooked portion of the opening and closing unit, based on a force applied toward a first rotation direction along which the hook portion is hooked to the hooked portion.

In the transport apparatus, in a non-hooked state in which the hook portion is not hooked on the hooked portion, an operator directly pushes the transport path member from below to bring the hook portion into contact with the hooked portion, and then the hook portion is rotated in a second rotation direction opposite to the first rotation direction. In such a transport apparatus, unless the operator directly pushes the transport path member, the hook portion cannot be rotated in the second rotation direction. Therefore, it is necessary to separately perform an operation of closing the opening and closing unit and an operation of rotating the hook portion in the second rotation direction.

Aspects of non-limiting embodiments of the present disclosure relate to enabling movement of an opening and closing unit from an open position to a closed position and rotation of a hook portion in a second rotation direction to be performed by a single operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a transport apparatus including: an apparatus body; an opening and closing unit attached to the apparatus body so as to be openable and closable between a closed position where an upper surface of the apparatus body is covered and an open position where the upper surface of the apparatus body is exposed, the opening and closing unit including, inside the opening and closing unit, a transport path along which a target material is transported; a transport path member that has a transport path surface constituting a part of the transport path, is rotatably supported by the opening and closing unit at one end portion side of the transport path member, and is configured such that the transport path is opened when the other end portion side of the transport path member moves downward from the opening and closing unit; and a hook portion that is rotatably attached to the other end portion side of the transport path member, is configured to hold the transport path member in a closed state of the transport path, in a hooked state in which the hook portion is hooked on a hooked portion of the opening and closing unit, based on a force applied toward a first rotation direction along which the hook portion is hooked to the hooked portion, and is configured to rotate in a second rotation direction opposite to the first rotation direction by coming into contact with the hooked portion while the transport path member is pushed upward by the upper surface of the apparatus body when the opening and closing unit is moved from the open position to the closed position in a non-hooked state in which the hook portion is not hooked on the hooked portion.

BRIEF DESCRIPTION OF DRAWINGS

Exemplary embodiment(s) of the present invention will be described in detail based on the following figures, wherein.

DETAILED DESCRIPTION

Hereinafter, an example of an exemplary embodiment according to the present invention will be described with reference to the drawings.

(Image Forming Apparatus 10)

Figure 1:
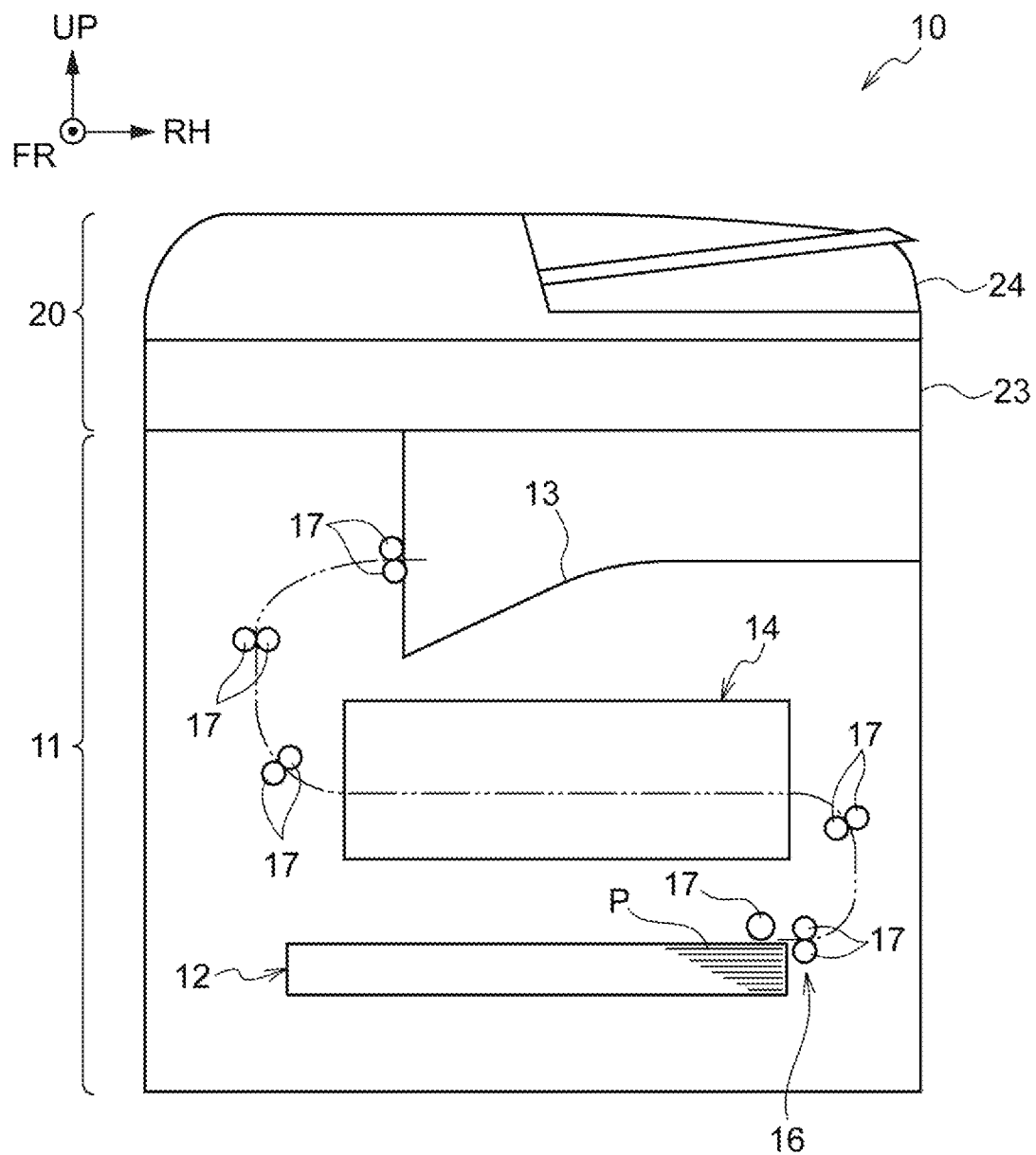
FIG. 1 is a schematic view of an image forming apparatus according to the exemplary embodiment.

An image forming apparatus 10 according to the exemplary embodiment will be described. FIG. 1 is a schematic view of the image forming apparatus 10.

An arrow UP illustrated in each drawing including FIG. 1 indicates an upper side (vertically upper side) of the apparatus. Therefore, a direction opposite to the arrow UP is a lower side (vertically lower side) of the apparatus. An arrow FR illustrated in each drawing including FIG. 1 indicates a front side of the apparatus. Therefore, a direction opposite to the arrow FR is a rear side of the apparatus. An arrow RH illustrated in each drawing including FIG. 1 indicates a right side of the apparatus. Therefore, a direction opposite to the arrow RH is a left side of the apparatus. Since these directions are defined for convenience of description, an apparatus configuration is not limited to these directions.

A front-rear direction and a left-right direction are also referred to as a transverse direction, a lateral direction, or a horizontal direction. In addition, in each direction of the apparatus, a direction may be indicated without the term "apparatus". That is, for example, "upper side of the apparatus" may be simply referred to as "upper side". A symbol written as "x" in a circle ("○") in the drawings means an arrow directed from a front side to a back side of a paper surface. In addition, a symbol written as "•" in the circle ("○") in the drawings means an arrow directed from the back side to the front side of the paper surface.

The image forming apparatus 10 illustrated in FIG. 1 is an apparatus that forms an image. Specifically, as illustrated in FIG. 1, the image forming apparatus 10 includes an image forming apparatus body 11, a medium accommodating unit 12, a medium discharge unit 13, an image forming unit 14, a transport mechanism 16, and an image reading apparatus 20. Hereinafter, each part of the image forming apparatus 10 will be described.

(Image Forming Apparatus Body 11)

The image forming apparatus body 11 illustrated in FIG. 1 is a part in which each component of the image forming apparatus 10 is provided. Specifically, the image forming apparatus body 11 is configured by a box-shaped housing (see FIGS. 2 and 3).

In the exemplary embodiment, as illustrated in FIG. 1, for example, the medium accommodating unit 12, the image forming unit 14, and the transport mechanism 16 are included inside the image forming apparatus body 11. The image reading apparatus 20 is provided at an upper end portion of the image forming apparatus body 11. The medium discharge unit 13 is provided outside the image forming apparatus body 11 and between the image reading apparatus 20 and the image forming unit 14.

(Medium Accommodating Unit 12)

As illustrated in FIG. 1, the medium accommodating unit 12 is a part that accommodates a recording medium P in the image forming apparatus 10. The recording medium P accommodated in the medium accommodating unit 12 is supplied to the image forming unit 14. As the recording medium P, for example, paper P is used.

(Medium Discharge Unit 13)

The medium discharge unit 13 illustrated in FIG. 1 is a part to which the recording medium P is discharged in the image forming apparatus 10. The recording medium P on which an image is formed by the image forming unit 14 is discharged to the medium discharge unit 13.

(Image Forming Unit 14)

The image forming unit 14 illustrated in FIG. 1 has a function of forming an image on the recording medium P fed from the medium accommodating unit 12. Examples of the image forming unit 14 include an inkjet image forming unit that forms an image on the recording medium P using ink, and an electrophotographic image forming unit that forms an image on the recording medium P using toner.

In the inkjet image forming unit, for example, an image is formed on the recording medium P by ejecting ink droplets from an ejecting unit onto the recording medium P. As for the inkjet image forming unit, an image may be formed on the recording medium P by ejecting ink droplets from the ejecting unit onto a transfer body and transferring the ink droplets from the transfer body onto the recording medium P.

In the electrophotographic image forming unit, for example, charging, exposure, development, transfer, and fixing processes are performed to form an image on the recording medium P. As for the electrophotographic image forming unit, an image may be formed on the recording medium P by performing charging, exposure, development, and transfer processes to form an image on a transfer body, transferring the image from the transfer body to the recording medium P, and then fixing the image on the recording medium P.

In the image forming apparatus 10, when an image of a document G (see FIG. 4) is copied, the image forming unit 14 forms an image read by to-be-described reading units 40 and 54 (see FIG. 4) of the image reading apparatus 20 on the recording medium P.

The image forming unit is not limited to the inkjet image forming unit or the electrophotographic image forming unit, and various image forming units may be used.

(Transport Mechanism 16)

The transport mechanism 16 illustrated in FIG. 1 is a mechanism that transports the recording medium P. The transport mechanism 16 transports the recording medium P by, for example, transport members 17 such as transport rolls. The transport member 17 may be a transport belt or the like, and may be any member as long as the recording medium P can be transported by applying a transport force to the recording medium P.

The transport mechanism 16 transports the recording medium P from the medium accommodating unit 12 to the image forming unit 14. The transport mechanism 16 transports the recording medium P on which the image is formed by the image forming unit 14 from the image forming unit 14 to the medium discharge unit 13.

(Image Reading Apparatus 20)

Figure 2:
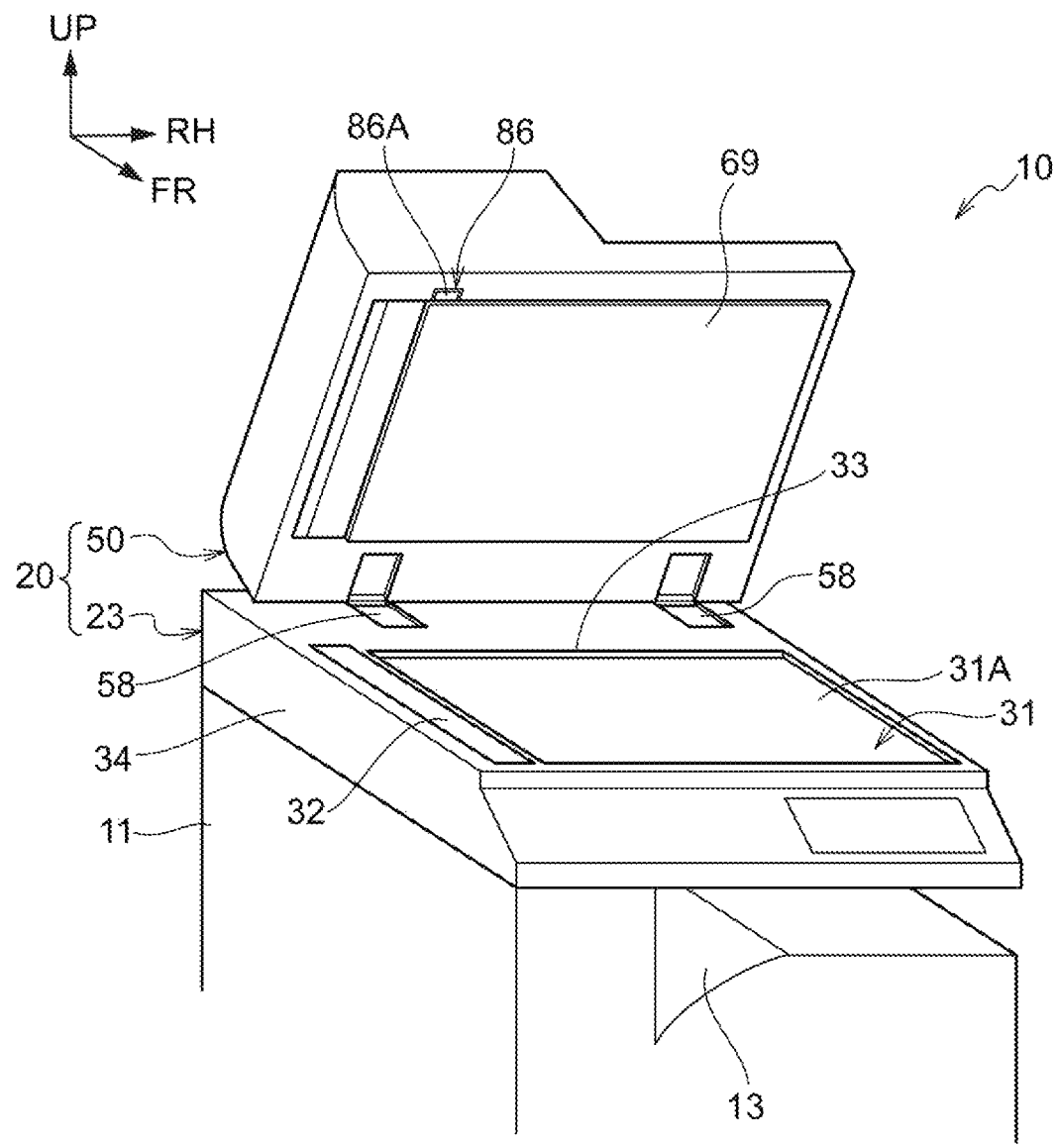
FIG. 2 is a perspective view of an image reading apparatus according to the exemplary embodiment, illustrating a state in which an opening and closing body is in an open position.
Figure 3:
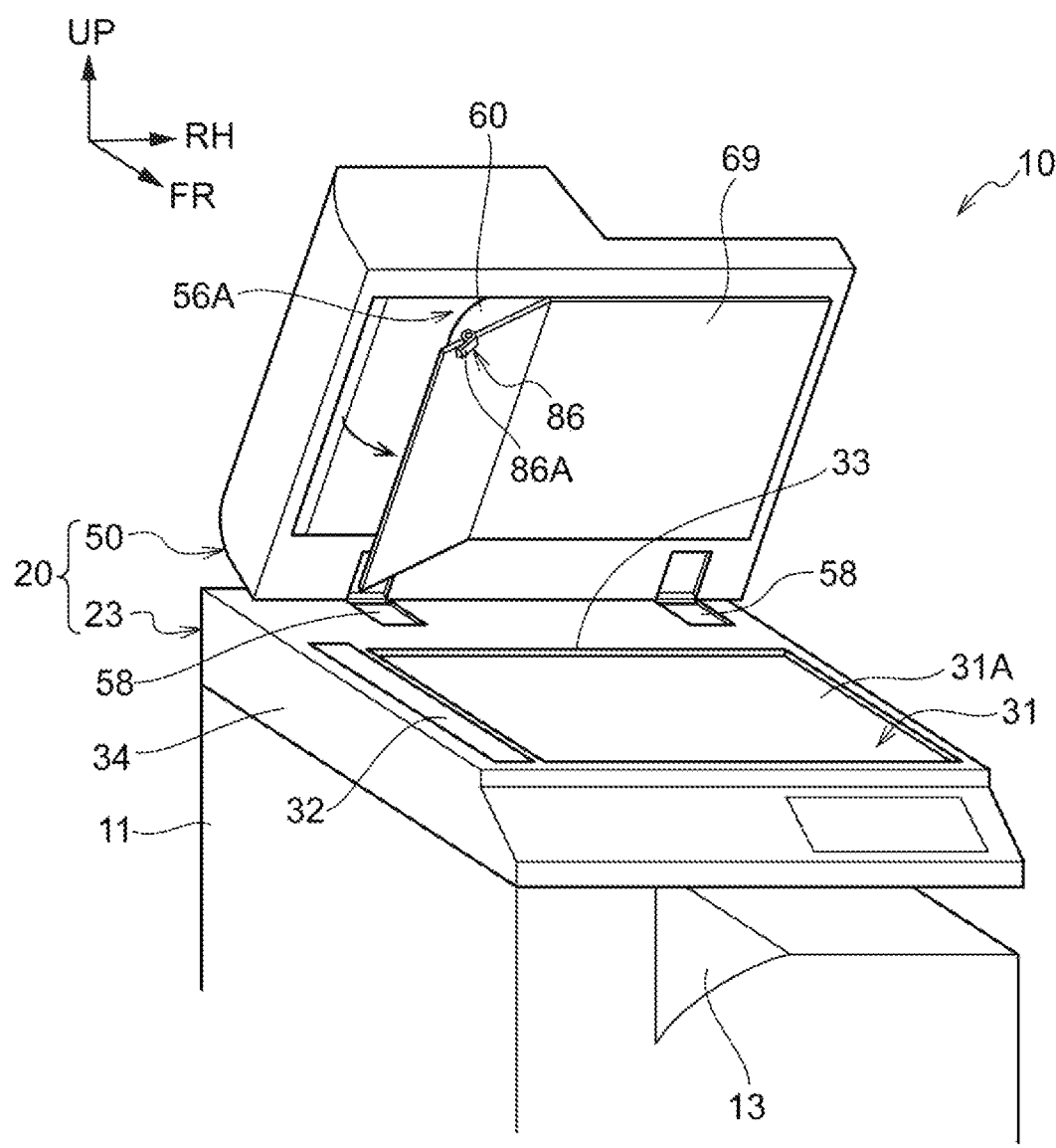
FIG. 3 is a perspective view of the image reading apparatus, illustrating a state in which a transport path is in an opened state in the configuration illustrated in FIG. 2.
Figure 4:
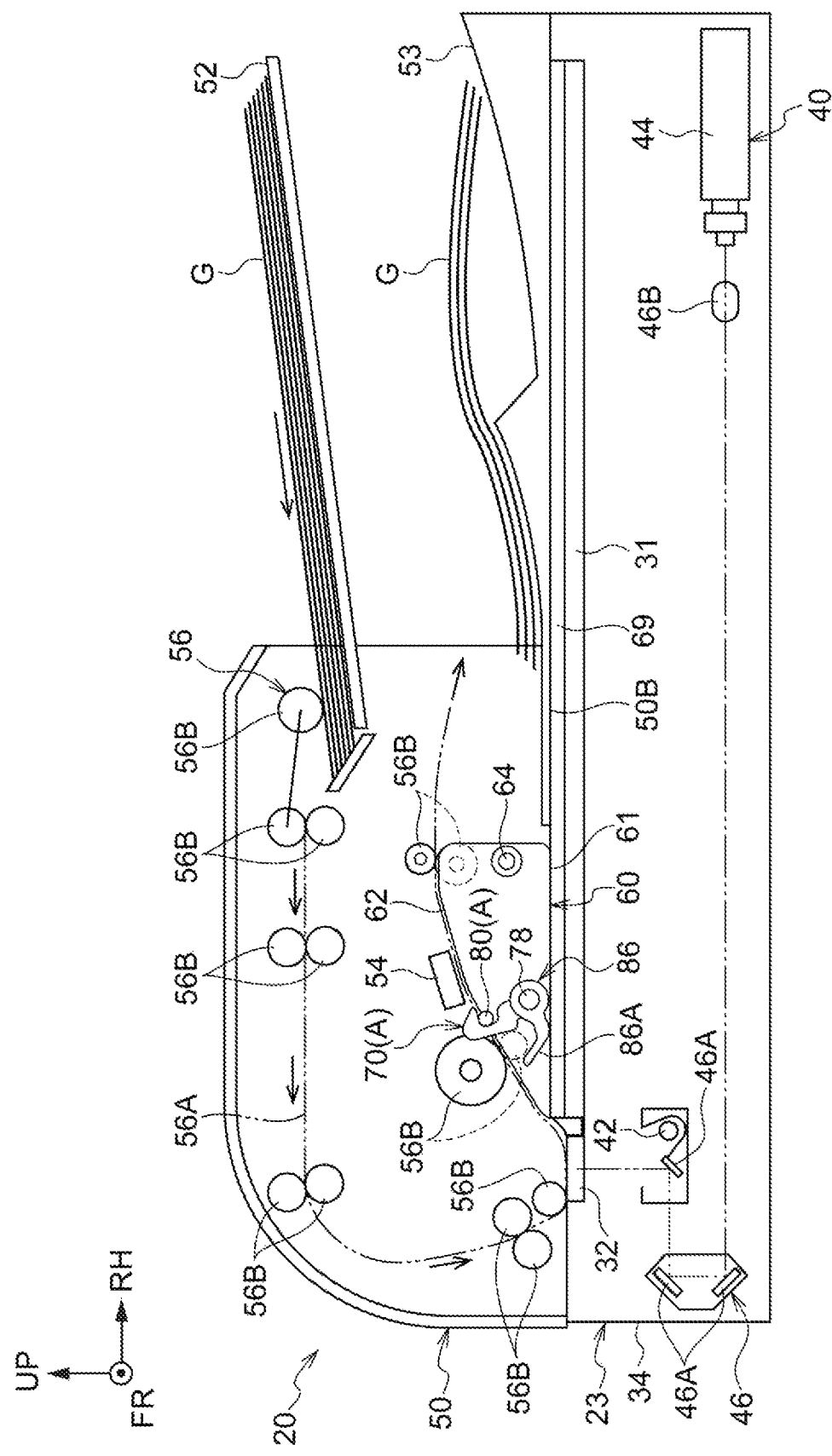
FIG. 4 is a schematic view of the image reading apparatus according to the exemplary embodiment.

FIG. 2 is a perspective view illustrating a state in which an opening and closing body 50 described below is in an open position in the image reading apparatus 20. FIG. 3 is a perspective view illustrating a state in which a transport path 56A is opened in the configuration illustrated in FIG. 2. FIG. 4 is a schematic view of the image reading apparatus 20.

Figure 8:
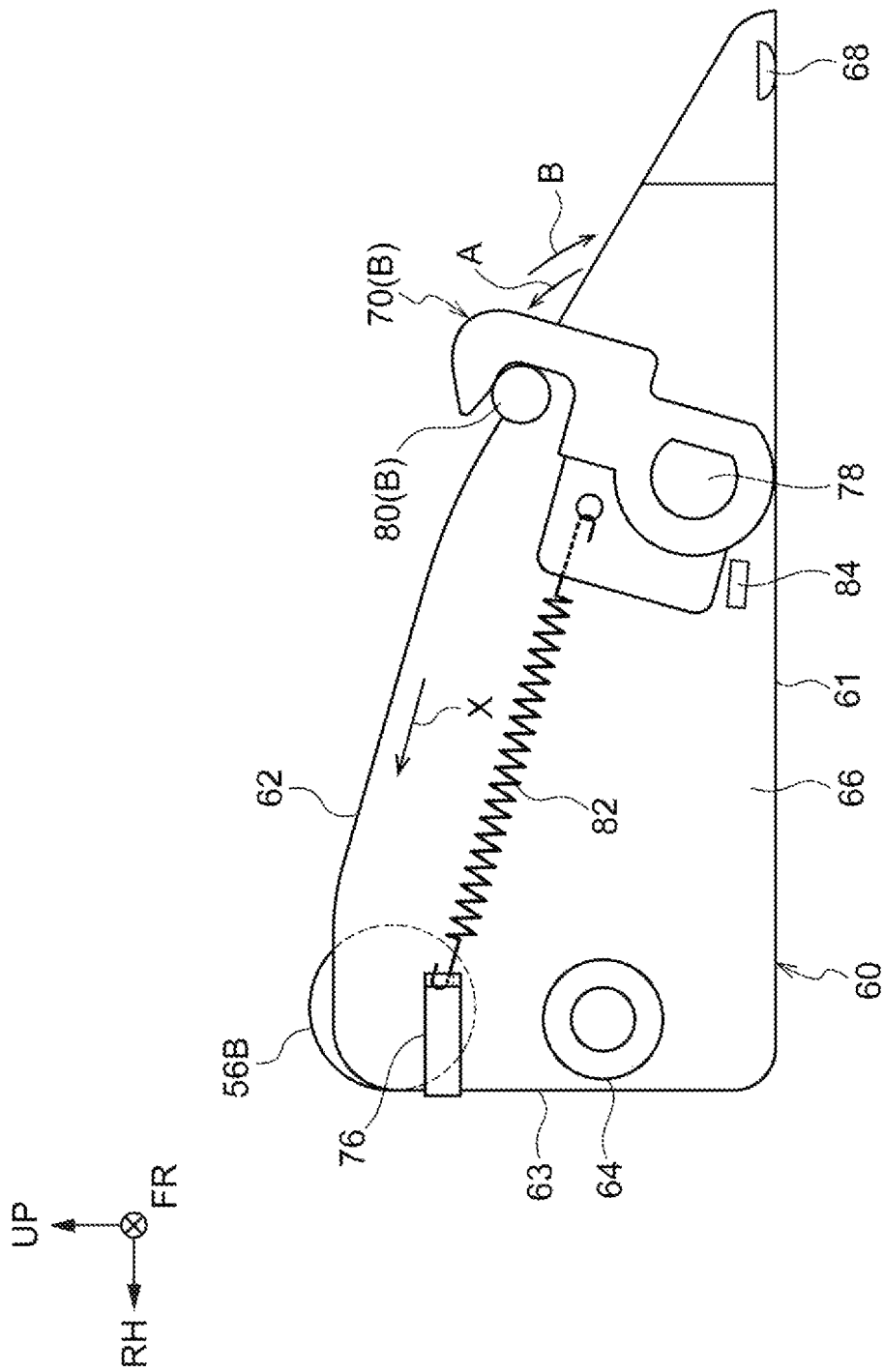
FIG. 8 is a schematic view of the transport path member according to the exemplary embodiment as viewed from the rear.

The image reading apparatus 20 illustrated in FIGS. 2, 3, and 4 is an apparatus that reads an image of the document G. The image reading apparatus 20 is an example of a "transport apparatus". Specifically, as illustrated in FIGS. 2, 3, and 4, the image reading apparatus 20 includes an image reading apparatus body 23, a reading unit 40, the opening and closing body 50, a transport path member 60 (see FIGS. 3 and 4), a shaft body 80 (see FIG. 4), a hook member 70 (see FIG. 4), and an operation unit 86 (see FIG. 4). As illustrated in FIG. 8, the image reading apparatus 20 further includes a tension coil spring 82 and a restricting unit 84.

(Image Reading Apparatus Body 23)

The image reading apparatus body 23 illustrated in FIGS. 2 and 3 is a part in which each component of the image reading apparatus 20 is included. The image reading apparatus body 23 is an example of an "apparatus body". Specifically, as illustrated in FIGS. 2 and 3, the image reading apparatus body 23 includes a housing 34, a first platen glass 31, a second platen glass 32, and a support portion 58.

The housing 34 is configured in a box shape whose upper side is opened. The first platen glass 31 is disposed in the opening of the housing 34. The first platen glass 31 is a member on which a document whose image is to be read in a stationary state is placed, and through which light emitted toward the document passes. The second platen glass 32 is a member through which light emitted toward the transported document passes.

The support portion 58 (specifically, a hinge) has a function of supporting the opening and closing body 50 so as to be openable and closable. The support portion 58 is provided on a rear side of an upper portion of the housing 34 of the image reading apparatus body 23.

Further, an edge 33 surrounding the first platen glass 31 is formed in the image reading apparatus body 23. The edge 33 protrudes upward at a rear end portion side, a front end portion side, a left end portion side, and a right end portion side of an upper surface 31A of the first platen glass 31.

Therefore, a step is formed between the edge 33 and the upper surface 31A of the first platen glass 31.

(Reading unit 40)

The reading unit 40 illustrated in FIG. 4 has a function of reading an image of the document G. Specifically, as illustrated in FIG. 4, the reading unit 40 includes a light source 42, a photoelectric conversion element 44, and an optical system 46 including a mirror 46A and a lens 46B. In the reading unit 40, one surface of the document G is irradiated with light from the light source 42. The optical system 46 forms an image based on reflected light that is reflected by the document G on the photoelectric conversion element 44. The photoelectric conversion element 44 converts the imaged light into an electric signal.

As the photoelectric conversion element 44, for example, an image sensor such as a CCD (Charge Coupled Device) or a CMOS (Complementary Metal Oxide Semiconductor) is used. As described above, the reading unit 40 reads an image on one side of the document G. The electric signal generated by the reading unit 40 and including image information is sent to the image forming unit 14, and the image forming unit 14 forms an image based on the electric signal.

(Opening and Closing Body 50)

The opening and closing body 50 illustrated in FIGS. 1 to 4 is a structure that is opened and closed with respect to the image reading apparatus body 23. The opening and closing body 50 is an example of an "opening and closing unit". Specifically, the opening and closing body 50 is attached to the image reading apparatus body 23 so as to be openable and closable between a closed position (position illustrated in FIGS. 1 and 4) where the upper surface 31A of the first platen glass 31 of the image reading apparatus body 23 is covered and an open position (position illustrated in FIGS. 2 and 3) where the upper surface 31A of the first platen glass 31 of the image reading apparatus body 23 is exposed.

Specifically, as illustrated in FIGS. 2 and 3, a rear end portion of the opening and closing body 50 is supported by the support portion 58 provided on a rear portion of the image reading apparatus body 23, and the opening and closing body 50 is opened and closed by a front end portion thereof moving up and down with the rear end portion as a fulcrum. As described above, the opening and closing body 50 is openable and closable between the closed position (the position illustrated in FIGS. 1 and 4) and the open position (the position illustrated in FIGS. 2 and 3) with the rear end portion attached to the image reading apparatus body 23 and the front end portion as a free end portion.

Further, as illustrated in FIG. 4, the opening and closing body 50 includes a document accommodating unit 52, a document discharge unit 53, the reading unit 54, and a transport mechanism 56. The document accommodating unit 52 is a part that accommodates the document G in the image reading apparatus 20. The document G accommodated in the document accommodating unit 52 is supplied to reading positions of the reading units 40 and 54. The document G accommodated in the document accommodating unit 52 is, for example, paper on which an image is formed.

The document discharge unit 53 is a part to which the document G is discharged in the image reading apparatus 20. The document G whose image is read by the reading units 40 and 54 is discharged to the document discharge unit 53.

The reading unit 54 has a function of reading an image on the other surface of the document G (surface opposite to the surface read by the reading unit 40). As the reading unit 54, for example, a close contact type image sensor called CIS (Contact Image Sensor) is used.

The transport mechanism 56 is a mechanism that transports the document G. The transport mechanism 56 includes a transport path 56A included inside the opening and closing body 50, and transport members 56B configured by transport rolls or the like. The transport path 56A is formed in a C shape from the document accommodating unit 52 toward the document discharge unit 53, as viewed in the front-rear direction. A view in the front-rear direction refers to a view seen from one of the front side and the rear side toward the other side. The transport members 56B transport the document G accommodated in the document accommodating unit 52 to the document discharge unit 53 along the transport path 56A.

In the exemplary embodiment, in a state in which the opening and closing body 50 is in the closed position, an image on one surface of the document G transported along the transport path 56A is read by the reading unit 40, and an image on the other surface of the document G is read by the reading unit 54.

The upper surface 31A of the first platen glass 31 is an example of an "upper surface of the apparatus body". The front-rear direction corresponds to a direction intersecting with (specifically, a direction orthogonal to) the transport direction of the transport path 56A. Therefore, in each member including the opening and closing body 50, the rear end portion is an example of one end portion in the direction intersecting with the transport direction, and the front end portion is an example of the other end portion in the direction intersecting with the transport direction.

(Transport Path Member 60)

Figure 5:
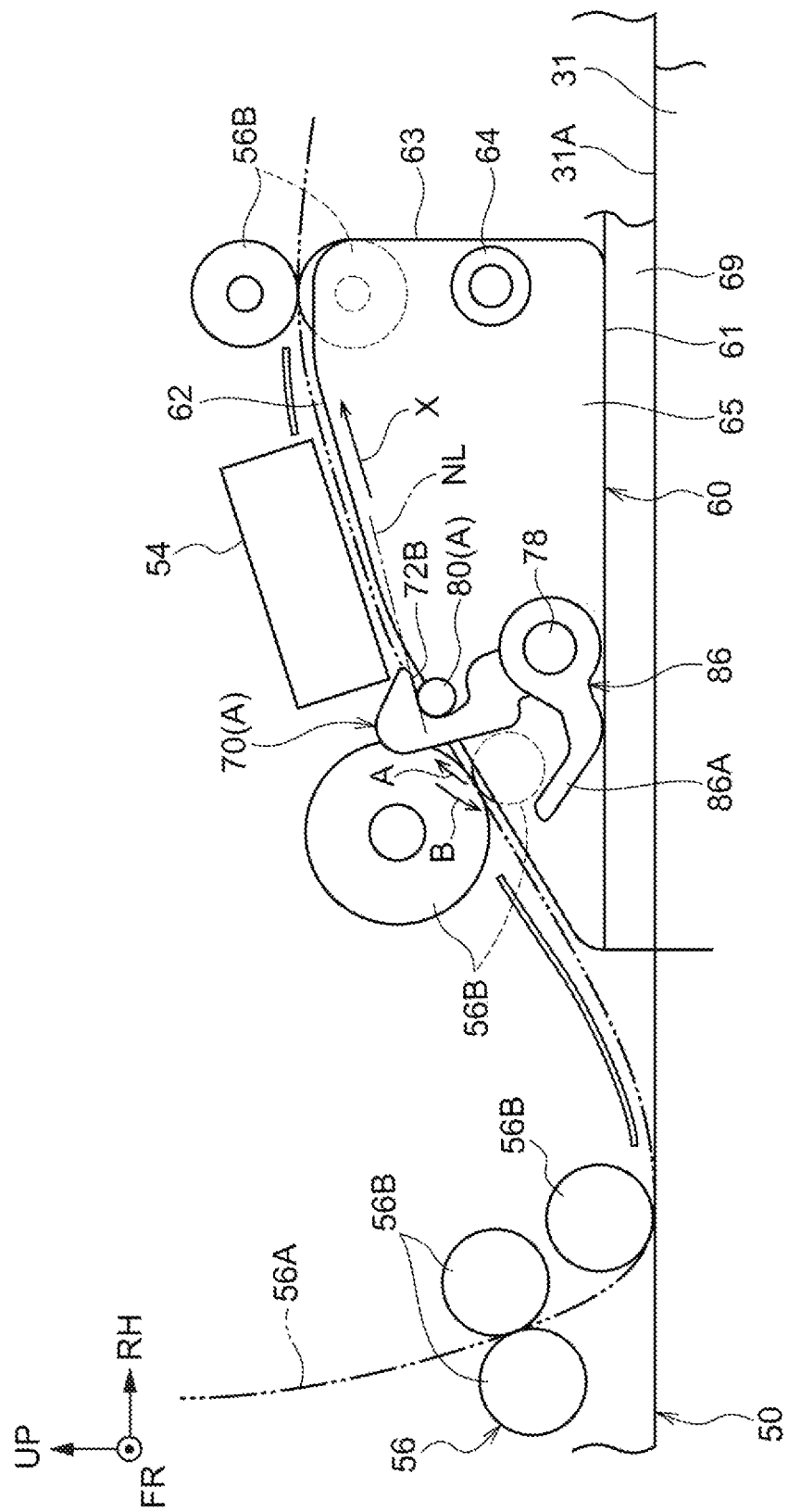
FIG. 5 is a schematic view of a part of the opening and closing body including a transport path member according to the exemplary embodiment in an enlarged manner.
Figure 6:
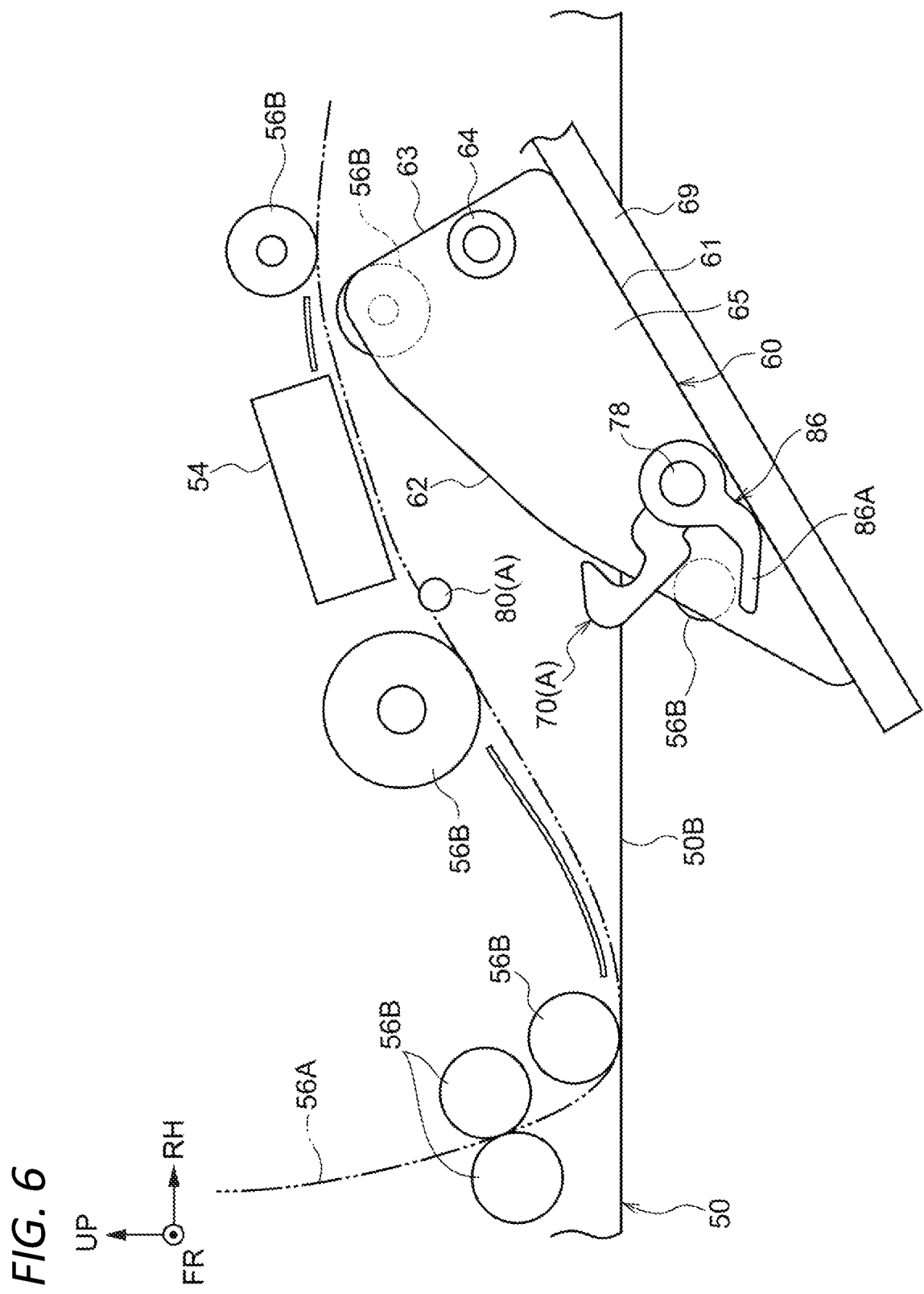
FIG. 6 is a schematic view illustrating a state in which the transport path is in the opened state in the configuration illustrated in FIG. 5.
Figure 7:
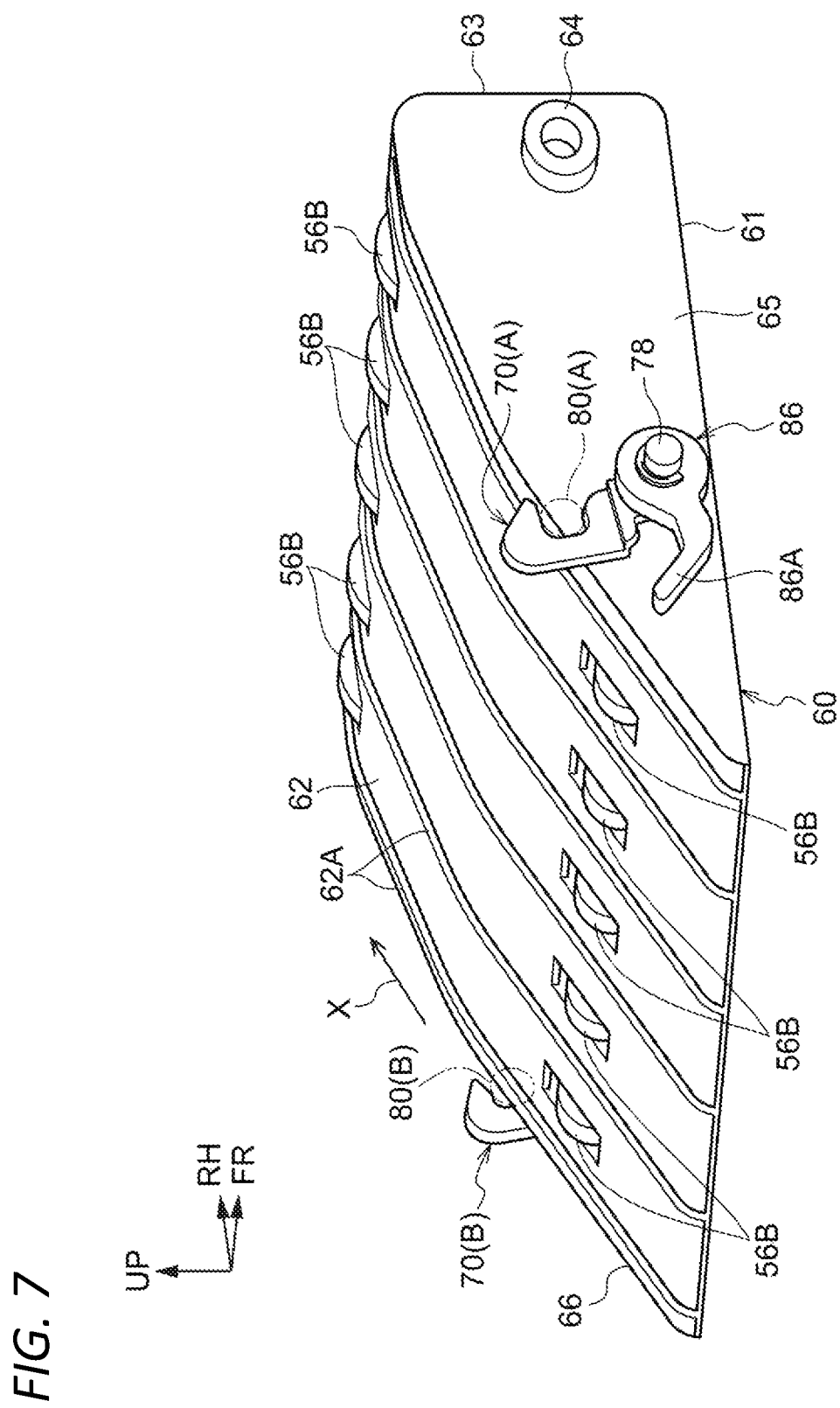
FIG. 7 is a perspective view of the transport path member according to the exemplary embodiment.
Figure 9:
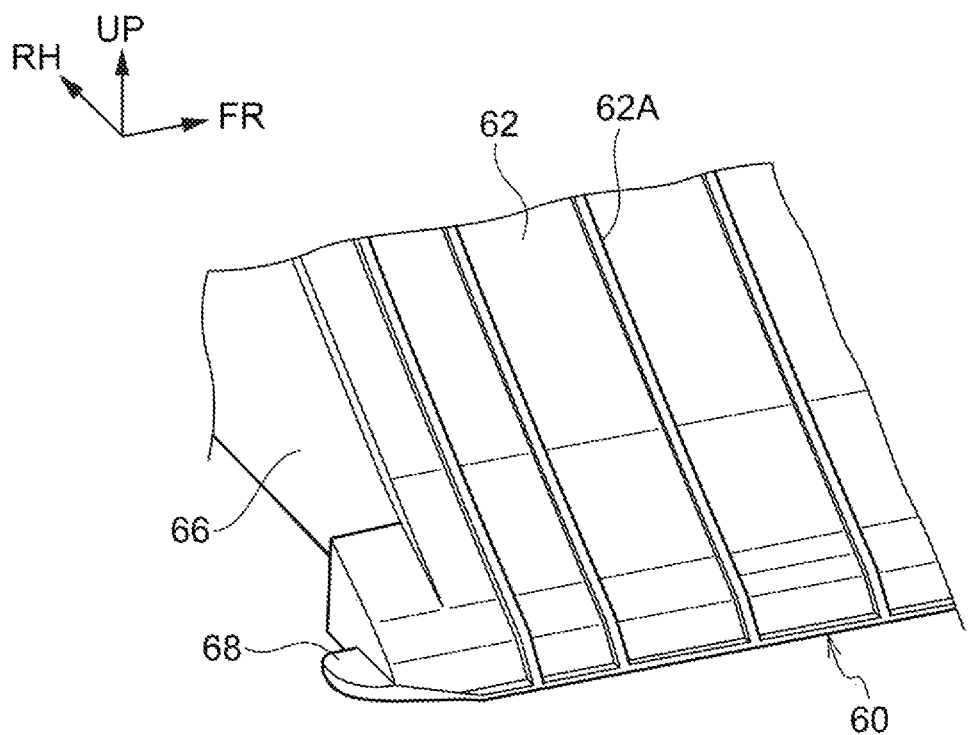
FIG. 9 is a perspective view of a part of the transport path member according to the exemplary embodiment.
Figure 10:
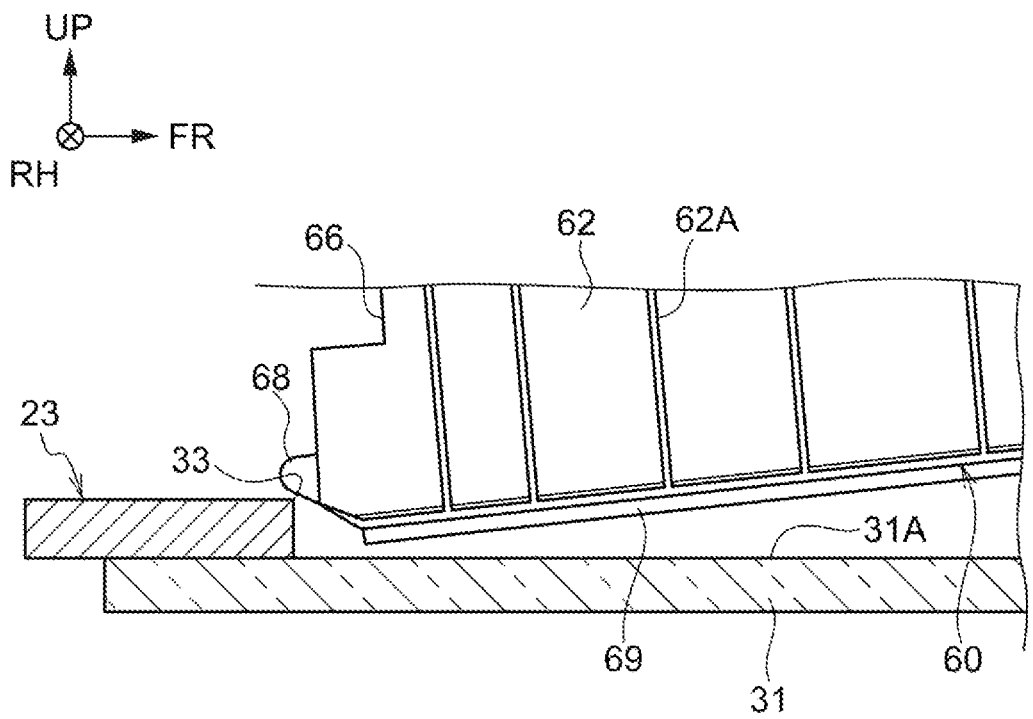
FIG. 10 is a side view of a part of the transport path member according to the exemplary embodiment.

FIG. 5 is a schematic view of a part of the opening and closing body 50 including the transport path member 60 in an enlarged manner. FIG. 6 is a schematic view illustrating a state in which the transport path 56A is in the opened state in the configuration illustrated in FIG. 5. FIG. 7 is a perspective view of the transport path member 60. FIG. 8 is a schematic view of the transport path member 60 as viewed from rear. FIG. 9 is a perspective view of a part of the transport path member 60. FIG. 10 is a side view of a part of the transport path member 60.

As illustrated in FIGS. 5 to 7, the transport path member 60 is a member having a transport path surface 62 constituting a part of the transport path 56A. As illustrated in FIGS. 5 and 6, the transport path member 60 is formed in a substantially right-angled triangular shape having a bottom surface 61, a side surface 63 extending upward from the bottom surface 61, and the transport path surface 62 that is an inclined surface, as viewed in the front-rear direction. In the closed state, the transport path surface 62 is a surface inclined obliquely upward toward a downstream side (that is, a right side) in the transport direction. As illustrated in FIG. 7, plural ribs 62A formed along the transport direction are disposed on the transport path surface 62 along the front-rear direction.

In each of the drawings, the transport direction in the transport path member 60 is indicated by an arrow X. The downstream side in the transport direction may be simply referred to as "downstream", and an upstream side in the transport direction may be simply referred to as "upstream". Further, the upstream side corresponds to the left side, and the downstream side corresponds to the right side.

A downstream end portion side (that is, a right end portion side) of the transport path member 60 is rotatably supported by the opening and closing body 50 (see FIGS. 5 and 6). Specifically, a support shaft 64 is provided on a downstream end portion side of a front surface 65 (see FIGS. 5, 6, and 7) and a rear surface 66 (see FIG. 8) of the transport path member 60. The transport path member 60 is supported by the opening and closing body 50 rotatably around the support shaft 64. Then, as illustrated in FIGS. 3 and 6, an upstream end portion side (that is, a left end portion side) of the transport path member 60 is moved downward from the opening and closing body 50 to open the transport path 56A.

As illustrated in FIGS. 8 to 10, a projection 68 that projects rearward from the transport path member 60 is provided at a lower end portion of the rear end portion of the transport path member 60. The projection 68 is disposed at an upstream end portion (that is, a left end portion) of the transport path member 60. A bottom surface of the projection 68 is curved so as to protrude downward.

When the opening and closing body 50 is moved from the open position to the closed position in a state in which the transport path 56A is opened by the transport path member 60 (that is, the state illustrated in FIGS. 3 and 6), as illustrated in FIG. 10, the projection 68 comes into contact with the edge 33 disposed on the rear end portion side of the upper surface 31A of the first platen glass 31 in the image reading apparatus body 23.

As illustrated in FIGS. 5 to 7, a part of the transport members 56B are provided in the transport path member 60. As illustrated in FIGS. 4 to 6, a cushioning material 69 is provided on a bottom surface 50B of the opening and closing body 50 including the bottom surface 61 of the transport path member 60. The cushioning material 69 can be compressed and deformed in the upper-lower direction. A downstream end portion of the transport path member 60 is an example of "one end portion". An upstream end portion of the transport path member 60 is an example of "the other end portion".

(Shaft Body 80)

The shaft body 80 illustrated in FIGS. 5 to 8 is a part on which the hook member 70 is hooked. The shaft body 80 is an example of a "hooked portion". In the exemplary embodiment, two shaft bodies 80 are provided in the image reading apparatus 20, as indicated by reference numerals 80(A) and 80(B) in the drawings. The two shaft bodies 80 are provided in the opening and closing body 50.

Specifically, one shaft body 80(A) protrudes from a side wall (not illustrated) facing the front surface 65 of the transport path member 60 toward a front surface 65 side (that is, the rear side). The hook member 70(A) is hooked on the shaft body 80(A).

The other shaft body 80(B) protrudes from a side wall (not illustrated) facing the rear surface 66 of the transport path member 60 toward a rear surface 66 side (that is, the front side). The hook member 70(B) is hooked on the shaft body 80(B).

The two shaft bodies 80 are disposed to face each other in the front-rear direction. That is, the two shaft bodies 80 are disposed so as to overlap with each other as viewed in the front-rear direction. More specifically, the two shaft bodies 80 are disposed at the same position in the upper-lower direction and the left-right direction in the opening and closing body 50 in the closed position.

As illustrated in FIGS. 5 and 8, lower ends of the two shaft bodies 80 are disposed below the transport path surface 62 of the transport path member 60 as viewed in the front-rear direction. Specifically, the two shaft bodies 80 are disposed so as to overlap with the transport path surface 62 of the transport path member 60 as viewed in the front-rear direction.

The two shaft bodies 80 are both formed in a circular shape as viewed in the front-rear direction. The shape of the shaft body 80 may be a polygonal shape or the like as viewed in the front-rear direction, and various shapes may be used as the shape of the shaft body 80.

(Hook Member 70, Tension Coil Spring 82, Restricting Unit 84, and Operation Unit 86)

Figure 11:
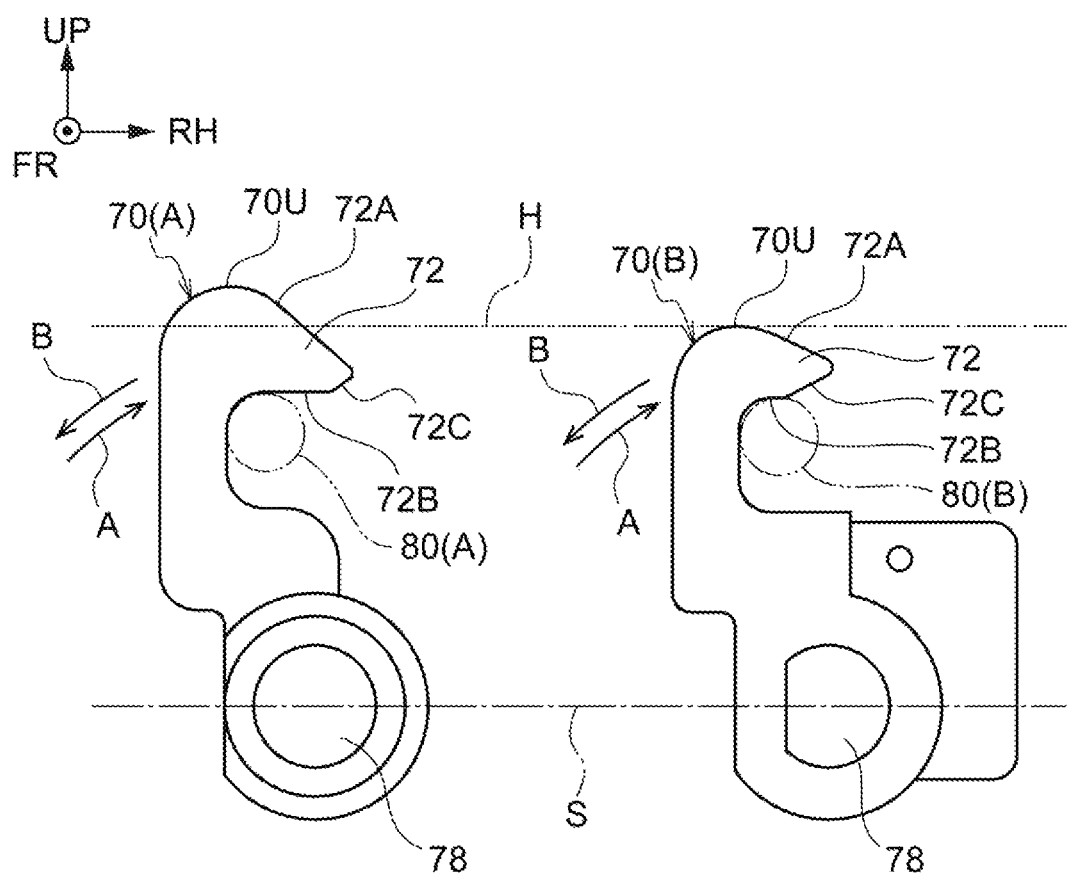
FIG. 11 is a front view of hook members according to the exemplary embodiment.
Figure 12:
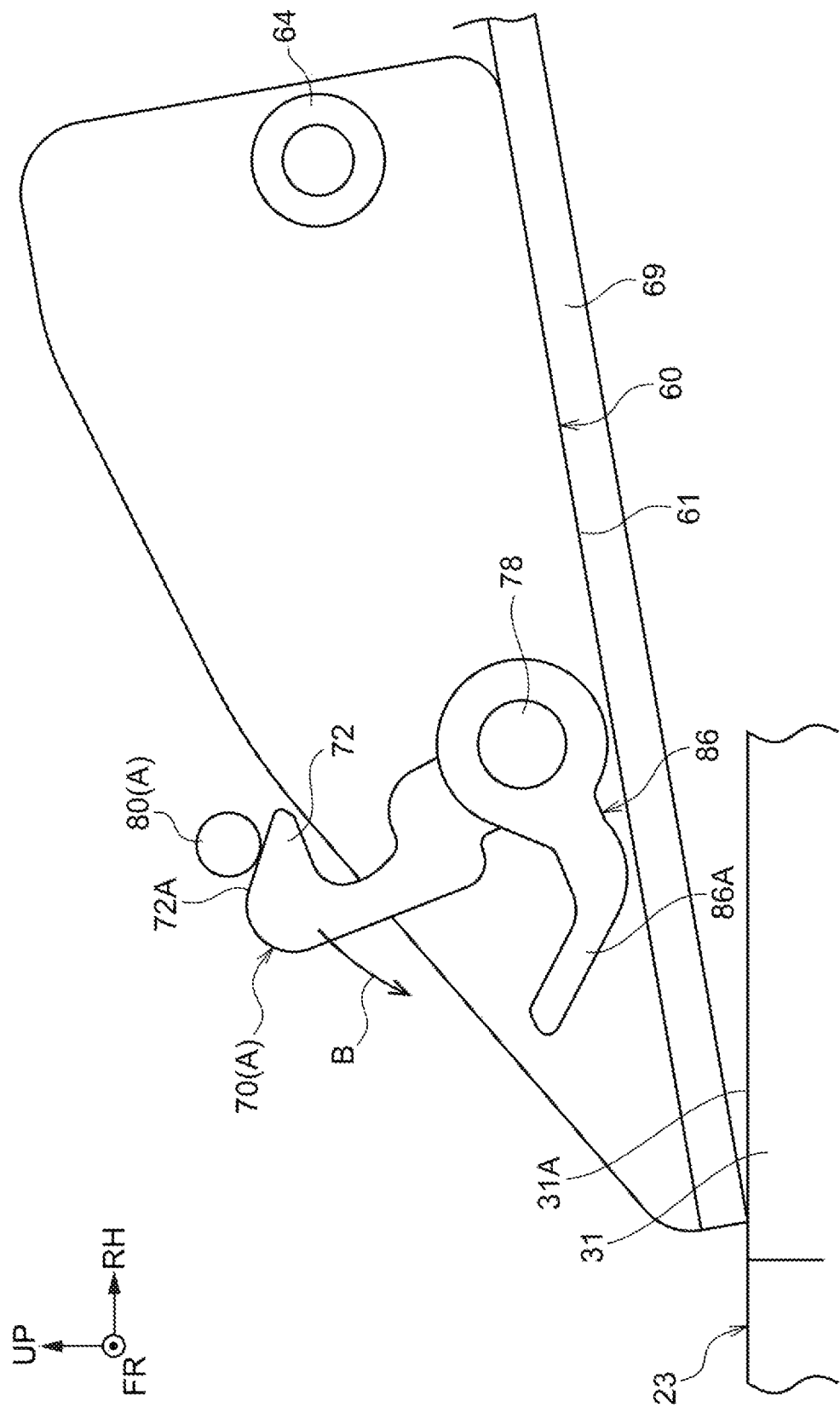
FIG. 12 is a schematic view illustrating a state in which an upper surface of the hook member according to the exemplary embodiment is in contact with a shaft body.
Figure 13:
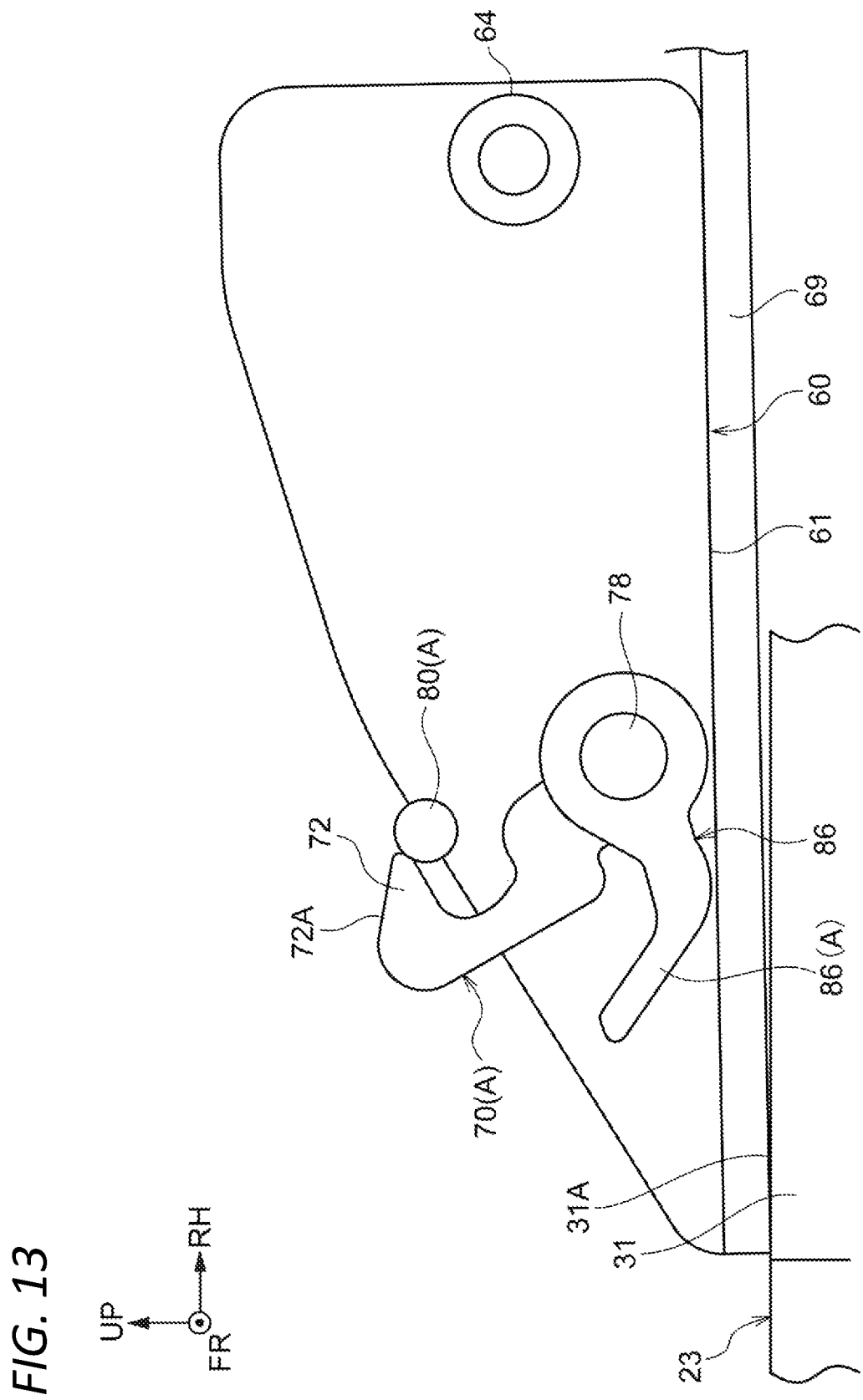
FIG. 13 is a schematic view illustrating a state in which a tip portion of the hook member according to the exemplary embodiment is caught onto the shaft body.
Figure 14:
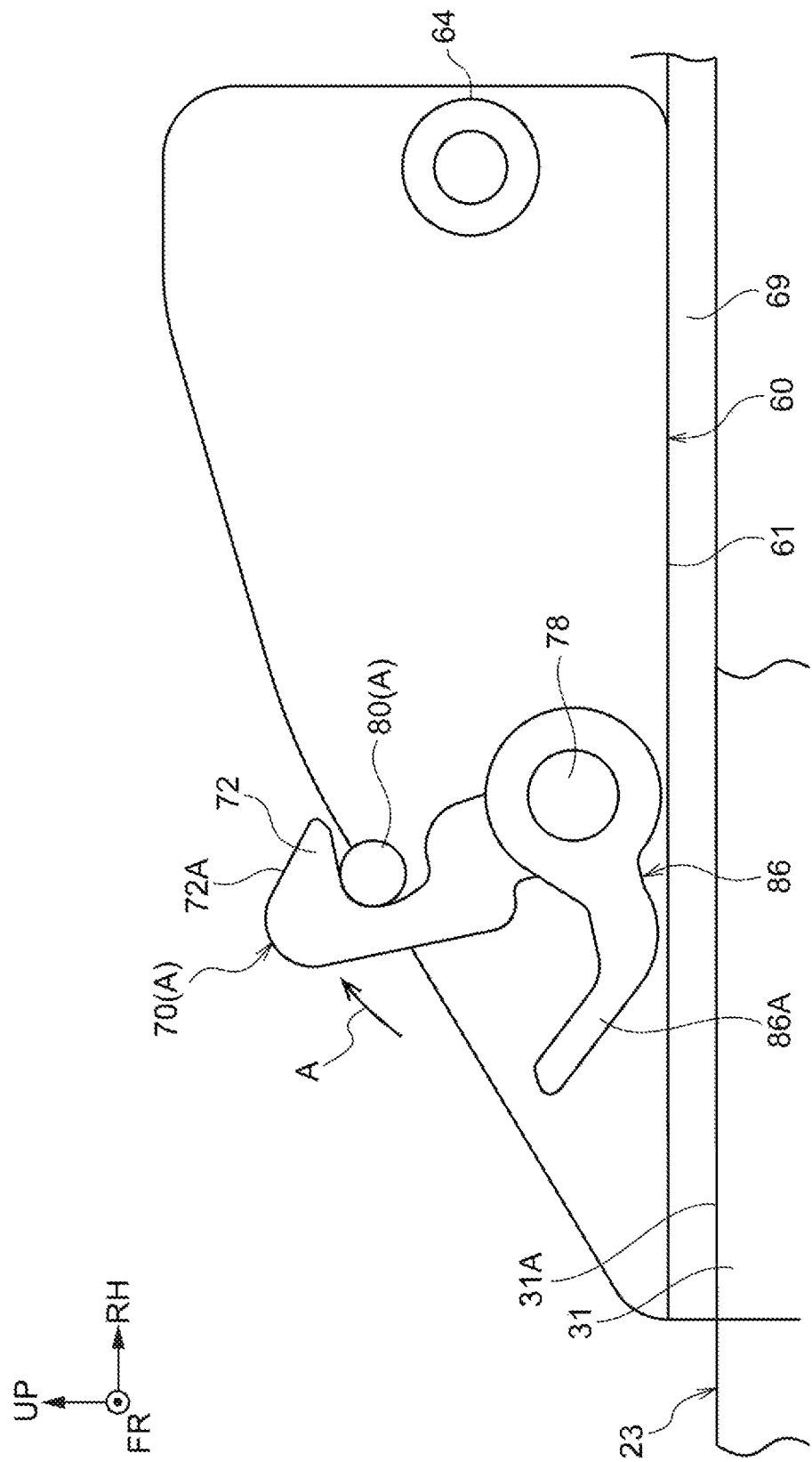
FIG. 14 is a schematic view illustrating a hooked state in which the hook member according to the exemplary embodiment is hooked on the shaft body.

FIG. 11 is a front view of the hook members 70. FIG. 12 is a schematic view illustrating a state in which an upper surface 72A of the hook member 70 is in contact with the shaft body 80. FIG. 13 is a schematic view illustrating a state in which a tip portion 72 of the hook member 70 is caught onto the shaft body 80. FIG. 14 is a schematic view illustrating a hooked state in which the hook member 70 is hooked on the shaft body 80.

The hook member 70 illustrated in FIG. 11 is a member to be hooked on the shaft body 80. The hook member 70 is an example of a "hook portion". In the exemplary embodiment, two hook members 70 are provided in the image reading apparatus 20, as indicated by reference numerals 70(A) and 70(B) in the drawings.

As illustrated in FIG. 11, the two hook members 70 are configured with hooks each formed in a hook shape. In the exemplary embodiment, as described below, the configuration of the hook member 70(A) is different from that of the hook member 70(B) in terms of shape, length, or the like.

As illustrated in FIGS. 5, 7, and 8, the two hook members 70 are rotatably attached to the upstream end portion side (that is, the left end portion side) of the transport path member 60. Specifically, as illustrated in FIGS. 5 and 7, a lower portion of the one hook member 70(A) is rotatably attached to an upstream end portion side of the front surface 65 of the transport path member 60. That is, the hook member 70(A) is disposed on a front end portion side of the transport path member 60.

As illustrated in FIG. 8, a lower portion of the other hook member 70(B) is rotatably attached to an upstream end portion side of the rear surface 66 of the transport path member 60. That is, the hook member 70(B) is disposed on a rear end portion side of the transport path member 60.

Further, the two hook members 70 are fixed to a shaft 78 extending in the front-rear direction. Specifically, the shaft 78 penetrates the transport path member 60 in the front-rear direction and is rotatably supported by the transport path member 60. The two hook members 70 are fixed to one axial end portion and the other axial end portion of the shaft 78, respectively. In this way, the two hook members 70 are connected by the shaft 78. Thus, the two hook members 70 are integrally rotatable in a hooking direction (the direction indicated by the arrow A in FIGS. 5, 8, and 11) along which the hook member 70 is hooked to the shaft body 80 and a release direction (the direction indicated by the arrow B in FIGS. 5, 8, and 11) opposite to the hooking direction. The hooking direction is an example of a "first rotation direction". The release direction is an example of a "second rotation direction".

As illustrated in FIG. 11, each of the two hook members 70 is formed in a hook shape having a tip portion 72 protruding toward the downstream side (that is, the right side). Specifically, the two hook members 70 each have an upper surface 72A, a bottom surface 72B, and an inclined surface 72C.

The upper surface 72A is configured by an inclined surface having a downslope from an upper end portion 70U (that is, a radially outer end portion with respect to the shaft 78) toward the hooking direction (that is, the right side and the downstream side). The bottom surface 72B is a surface that is in contact with the shaft body 80 in a state in which the hook member 70 is hooked on the shaft body 80 (hereinafter, referred to as a "hooked state of the hook member 70"), and is a surface facing a shaft 78 side (that is, a radially inner side). Specifically, as illustrated in FIG. 5, in the hooked state of the hook member 70, the bottom surface 72B is inclined with respect to the upper surface 31A of the first platen glass 31 of the image reading apparatus body 23 so as to form an upslope toward the hooking direction (that is, the right side and the downstream side) (see the dash-dot-dash line NL in FIG. 5). Inclination with the upslope refers to a state in which the bottom surface 72B is inclined with respect to the upper surface 31A in the hooked state of the hook member 70 so as to be directed to a direction (an upper side in FIG. 5) gradually away from the upper surface 31A as the bottom surface 72B is directed to the hooking direction side (that is, the right side and the downstream side). Therefore, an end portion of the bottom surface 72B on the hooking direction side (that is, the right side and the downstream side) is located at a position (the upper side in FIG. 5) away from the upper surface 31A relative to an end portion of the bottom surface 72B on a release direction side (that is, the left side and the upstream side). Inclination with downslope refers to a state in which the bottom surface 72B is inclined with respect to the upper surface 31A in the hooked state of the hook member 70 so as to be directed to a direction (a lower side in FIG. 5) gradually close to the upper surface 31A as the bottom surface 72B is directed to the hooking direction side (that is, the right side and the downstream side). In this case, the end portion of the bottom surface 72B on the hooking direction side (that is, the right side and the downstream side) is located at a position (the lower side in FIG. 5) closer to the upper surface 31A than the end portion of the bottom surface 72B on the release direction side (that is, the left side and the upstream side).

As illustrated in FIG. 11, the inclined surface 72C is a surface formed from a downstream end of the upper surface 72A to a downstream end of the bottom surface 72B, and is an inclined surface having an upslope toward the hooking direction. The tip portion 72 is formed by the upper surface 72A, the bottom surface 72B, and the inclined surface 72C.

In the exemplary embodiment, as illustrated in FIG. 11, a length (hereinafter referred to as a radial length) of the hook member 70(A) from the shaft 78 (specifically, an axial center (that is, a rotation center)) to a radially outermost portion is larger than a radial length of the hook member 70(B). In FIG. 11, the dash-dot-dash line S is a line passing through the axial center of the shaft 78. In FIG. 11, the dash-dot-dash line H is a line passing through the upper end portion 70U of the hook member 70(B).

Further, a length of the bottom surface 72B of the hook member 70(A) in the left-right direction is larger than a length of the bottom surface 72B of the hook member 70(B) in the left-right direction. A length of the inclined surface 72C of the hook member 70(A) in the left-right direction is smaller than a length of the inclined surface 72C of the hook member 70(B) in the left-right direction. Further, a gradient of the upper surface 72A of the hook member 70(A) is larger than a gradient of the upper surface 72A of the hook member 70(B).

The hook member 70(A) is an example of "one of the hook portions". The hook member 70(B) is an example of "the other of the hook portions".

As illustrated in FIG. 5, in the hooked state of the hook member 70, the transport path member 60 is held in a closed state in which the transport path 56A is closed by the transport path member 60. The closed state is a state in which the transport path surface 62 is not exposed. The hooked state of the hook member 70 is an example of a "hooked state in which the hook portion is hooked on the hooked portion".

As illustrated in FIG. 8, one end portion of the tension coil spring 82 is attached to the hook member 70(B), and the other end portion of the tension coil spring 82 is attached to an attachment portion 76 provided on the rear surface 66 of the transport path member 60. Thus, the tension coil spring 82 pulls the two hook members 70 in the hooking direction by an elastic force acting on the hook member 70(B). That is, a force toward the hooking direction acts on the two hook members 70. As described above, in the exemplary embodiment, the tension coil spring 82 is disposed on a rear end portion side of the transport path member 60. On the other hand, the tension coil spring 82 is not disposed on a front end portion side of the transport path member 60. The tension coil spring 82 is an example of an "elastic member".

As illustrated in FIGS. 5 to 7, the operation unit 86 is attached to the shaft 78 on a front side of the hook member 70(A). The operation unit 86 includes a lever 86A extending from the shaft 78 toward the upstream side (that is, the left side). When an operator performs an operation of rotating the lever 86A downward, the two hook members 70 are rotated in the release direction, and the hooked state of the two hook members 70 is released.

The restricting unit 84 illustrated in FIG. 8 has a function of restricting movement of the two hook members 70 in the hooking direction. Specifically, the restricting unit 84 is configured by a protrusion that protrudes rearward from the rear surface 66 of the transport path member 60. In a state in which the two hook members 70 are not hooked on the shaft body 80 (hereinafter, referred to as a "non-hooked state of the hook member 70"), the restricting unit 84 is in contact with the hook member 70(B) and restricts movement of the two hook members 70 toward the hooking direction. At a position where the hook member 70(B) is in contact with the restricting unit 84, the upper surfaces 72A of the two hook members 70 are disposed on tracks of the two shaft bodies 80 that relatively move with respect to the transport path member 60 that rotates around the support shaft 64. In other words, the restricting unit 84 functions as a positioning portion that positions each of the upper surfaces 72A of the two hook members 70 on the track of each of the two shaft bodies 80.

Therefore, in the exemplary embodiment, when the transport path member 60 rotates upward around the support shaft 64 in the non-hooked state of the hook member 70, as illustrated in FIG. 12, the upper surfaces 72A of the two hook members 70 comes into contact with the two shaft bodies 80, respectively. In the exemplary embodiment, as described below, first, the upper surface 72A of the hook member 70(A) comes into contact with the shaft body 80(A).

Further, in the exemplary embodiment, in the non-hooked state of the hook member 70, the transport path 56A is opened by the transport path member 60 due to own weight thereof, and the transport path member 60 is in a state of projecting downward from the bottom surface 50B (that is, a lower end portion) of the opening and closing body 50, as illustrated in FIG. 6. Therefore, when the opening and closing body 50 is moved from the open position to the closed position in the non-hooked state of the hook member 70, the transport path member 60 is pushed upward by the upper surface 31A of the first platen glass 31 of the image reading apparatus body 23 (see FIG. 12). The non-hooked state of the hook member 70 is an example of a "non-hooked state in which the hook portion is not hooked on the hooked portion".

In the exemplary embodiment, when the opening and closing body 50 is moved from the open position to the closed position in the non-hooked state of the hook member 70, as illustrated in FIG. 12, the hook member 70(A) comes into contact with the shaft body 80(A) while the transport path member 60 is pushed upward by the upper surface 31A of the first platen glass 31 of the image reading apparatus body 23, and the two hook members 70 rotate in the release direction (the direction indicated by the arrow B).

Here, the transport path member 60 is pushed upward by the upper surface 31A of the first platen glass 31 of the image reading apparatus body 23 due to the own weight of the opening and closing body 50 (including weight of components provided in the opening and closing body 50). Due to a load by which the transport path member 60 is pushed upward, the two hook members 70 are rotated in the release direction so as to be against a tension load of the tension coil spring 82. In the exemplary embodiment, a tension load of the tension coil spring 82 is set such that the hook member 70 is rotated in the release direction due to the upward load on the transport path member 60.

In the exemplary embodiment, since the radial length of the hook member 70(A) is larger than the radial length of the hook member 70(B), when the transport path member 60 is pushed upward, first, the hook member 70(A) comes into contact with the shaft body 80(A), and the two hook members 70 connected by the shaft 78 rotate integrally in the release direction in a state of having a gap between the hook member 70(B) and the shaft body 80(B). Thereafter, in a state in which the two hook members 70 are respectively in contact with the two shaft bodies 80, the two hook members 70 integrally rotate in the release direction. As described above, in the exemplary embodiment, a timing at which each of the two hook members 70 comes into contact with each of the two shaft bodies 80 is different.

Further, in the exemplary embodiment, after the two hook members 70 are rotated in the release direction by bringing the hook member 70 into contact with the shaft body 80 while the transport path member 60 is pushed upward by the upper surface 31A of the first platen glass 31 of the image reading apparatus body 23, as illustrated in FIG. 13, the tip portion 72 of the hook member 70(A) is caught onto the shaft body 80(A) (a half-latched state). Thereafter, the tip portion 72 of the hook member 70(B) is caught onto the shaft body 80(B).

Specifically, before the bottom surface 61 of the transport path member 60 rotating upward is along the upper surface 31A of the first platen glass 31 of the image reading apparatus body 23, the tip portions 72 of the two hook members 70 are caught onto the shaft bodies 80. That is, in a state in which the bottom surface 61 of the transport path member 60 rotating upward is inclined with respect to the upper surface 31A of the first platen glass 31 of the image reading apparatus body 23, the tip portions 72 of the two hook members 70 are caught onto the shaft bodies 80.

Then, after the tip portions 72 of the two hook members 70 are caught onto the shaft bodies 80, as illustrated in FIG. 14, the transport path member 60 is raised by the elastic force of the tension coil spring 82, and the two hook members 70 are rotated in the hooking direction (the direction indicated by the arrow A) to bring about the hooked state.

(Operation in Exemplary Embodiment)

In the exemplary embodiment, when the opening and closing body 50 is moved from the open position to the closed position in the non-hooked state of the hook member 70, as illustrated in FIG. 12, the hook member 70(A) comes into contact with the shaft body 80(A) while the transport path member 60 is pushed upward by the upper surface 31A of the first platen glass 31 of the image reading apparatus body 23, and then the two hook members 70 are rotated in the release direction (the direction indicated by the arrow B).

Therefore, the movement of the opening and closing body 50 from the open position to the closed position and the rotation of the hook members 70 in the release direction (the direction indicated by the arrow B) are performed by a single operation. That is, according to the configuration of the exemplary embodiment, for example, during the reading of an image of a document G or during copy of an image of a document G, when an operator performs an operation of moving the opening and closing body 50 from the open position to the closed position, an operation of rotating the hook members 70 in the release direction (the direction indicated by the arrow B) is also performed.

Further, in the exemplary embodiment, after the two hook members 70 are rotated in the release direction by bringing the hook members 70 into contact with the shaft bodies 80 while the transport path member 60 is pushed upward by the upper surface 31A of the first platen glass 31 of the image reading apparatus body 23, as illustrated in FIG. 13, the tip portion 72 of the hook member 70 is caught onto the shaft body 80 (half-latched state).

Therefore, the movement of the opening and closing body 50 from the open position to the closed position and the operation of the tip portion 72 of the hook member 70 being caught onto the shaft body 80 are performed by a single operation. That is, according to the configuration of the exemplary embodiment, for example, during the reading of an image of a document G or during copy of an image of a document G, when an operator performs an operation of moving the opening and closing body 50 from the open position to the closed position, the operation of the tip portion 72 of the hook member 70 being caught onto the shaft body 80 is also performed.

Further, in the exemplary embodiment, after the tip portions 72 of the two hook members 70 are caught onto the shaft bodies 80, as illustrated in FIG. 14, the transport path member 60 is raised by the elastic force of the tension coil spring 82, and the two hook members 70 are rotated in the hooking direction (the direction indicated by the arrow A) to bring about the hooked state.

Therefore, the movement of the opening and closing body 50 from the open position to the closed position and the operation of hooking the hook members 70 on the shaft bodies 80 are performed by a single operation. That is, according to the configuration of the exemplary embodiment, for example, during the reading of an image of a document G or during copy of an image of a document G, when an operator performs an operation of moving the opening and closing body 50 from the open position to the closed position, the hooked state of the hook members 70 are brought about. Therefore, in a case where at least one of the two hook members 70 is in the non-hooked state or a case where at least one of the two hook members 70 is not completely hooked on the shaft body 80, the hooked state of the hook members 70 is brought about by an operator performing the operation of moving the opening and closing body 50 from the open position to the closed position during the reading of an image of a document G or during copy of an image of a document G. As a result, closing failure of the transport path 56A is prevented, and clogging (so-called jam) of the document G in the transport path 56A and image reading failure by the reading unit 54 are prevented.

In the exemplary embodiment, as illustrated in FIG. 5, the bottom surface 72B of the hook member 70(A) is inclined with respect to the upper surface 31A of the first platen glass 31 of the image reading apparatus body 23 so as to form an upslope toward the hooking direction, in the hooked state of the hook member 70.

Therefore, as compared with a configuration in which in the hooked state of the hook member 70, the bottom surface 72B of the hook member 70(A) is parallel to the upper surface 31A of the first platen glass 31, since the hook member 70 is hooked on the shaft body 80 at a shallow rotation angle in the hooking direction, the hook member 70 is easily hooked on the shaft body 80 after the tip portion 72 of the hook member 70 is caught onto the shaft body 80.

In the exemplary embodiment, as illustrated in FIG. 11, the radial length of the hook member 70(A) is larger than the radial length of the hook member 70(B). Here, in a configuration in which the radial length of the hook member 70(A) is the same as that of the hook member 70(B) (hereinafter, referred to as a configuration A), when the transport path member 60 is pushed upward, the two hook members 70 simultaneously comes into contact with the two shaft bodies 80, respectively.

In contrast, in the exemplary embodiment, as described above, since the radial length of the hook member 70(A) is larger than the radial length of the hook member 70(B), when the transport path member 60 is pushed upward, first, the hook member 70(A) comes into contact with the shaft body 80(A), the two hook members 70 are rotated in a state of having a gap between the hook member 70(B) and the shaft body 80(B). Therefore, as compared with the configuration A, frictional resistance during the rotation in the release direction is small because the hook member 70 is in contact with the shaft body 80.

In the exemplary embodiment, the hook member 70(A) having larger radial length is disposed at the front end portion side of the transport path member 60.

Here, since the opening and closing body 50 is opened and closed by moving up and down with the rear end portion as a fulcrum and the front end portion as a free end portion, in a state in which the opening and closing body 50 is in the open position, it is easier to perform an operation on the front end portion of the transport path member 60 on the free end portion side than on the rear end portion of the transport path member 60 on the fulcrum side. Therefore, in the exemplary embodiment, when an operator pushes the transport path member 60 upward to rotate the hook member 70(A) in the release direction in a state in which the opening and closing body 50 is in the open position, it is easier for the operator to perform the operation of rotating the hook member 70(A) in the release direction as compared with a configuration in which the hook member 70(A) is disposed on the rear end portion side.

In the exemplary embodiment, the tension coil spring 82 is disposed on the rear end portion side of the transport path member 60. Therefore, as compared with a configuration in which the tension coil spring 82 is disposed on the front end portion side of the transport path member 60, an operator is prevented from coming into contact with the tension coil spring 82 in a state in which the opening and closing body 50 is in the open position.

In the exemplary embodiment, when the opening and closing body 50 is moved from the open position to the closed position in a state in which the transport path 56A is opened by the transport path member 60 (that is, the state illustrated in FIGS. 3 and 6), as illustrated in FIG. 10, the projection 68 comes into contact with the edge 33 disposed on the rear end portion side of the upper surface 31A of the first platen glass 31 in the image reading apparatus body 23.

Therefore, the transport path member 60 is prevented from being caught by the edge 33, as compared with a configuration that includes the transport path member 60 having no projection 68.

(Modification)

In the exemplary embodiment, the image reading apparatus 20 is used as an example of the transport apparatus, but the present invention is not limited thereto. As an example of the transport apparatus, an apparatus that performs processing other than reading of an image (for example, image forming processing of forming an image) on a target material to be transported may be used. In addition, as an example of the transport apparatus, an apparatus that transports a target material only for the purpose of transporting may be used.

In the exemplary embodiment, the document G is used as an example of a target material to be transported, but the present invention is not limited thereto. As an example of the target material, for example, a recording medium P on which an image is formed may be used, and any material that may be transported may be used.

In the exemplary embodiment, after the two hook members 70 are rotated in the release direction by bringing the hook members 70 into contact with the shaft bodies 80 while the transport path member 60 is pushed upward by the upper surface 31A of the first platen glass 31 of the image reading apparatus body 23, as illustrated in FIG. 13, the tip portion 72 of the hook member 70 is caught onto the shaft body 80, but the present invention is not limited thereto, and at least it is sufficient for the two hook members 70 to rotate in the release direction by bringing the hook member 70 into contact with the shaft body 80.

In the exemplary embodiment, as illustrated in FIG. 5, the bottom surface 72B of the hook member 70(A) is inclined with respect to the upper surface 31A of the first platen glass 31 of the image reading apparatus body 23 so as to form an upslope toward the hooking direction in the hooked state of the hook member 70, but the present invention is not limited thereto. For example, the bottom surface 72B of the hook member 70(A) may be parallel to the upper surface 31A of the first platen glass 31 in the hooked state of the hook member 70.

In the exemplary embodiment, as illustrated in FIG. 11, the radial length of the hook member 70(A) is larger than the radial length of the hook member 70(B), but the present invention is not limited thereto. For example, the hook member 70(A) may have the same length as the hook member 70(B).

In the exemplary embodiment, the hook member 70(A) having larger radial length is disposed on the front end portion side of the transport path member 60, but the present invention is not limited thereto. For example, the hook member 70(A) may be disposed on the rear end portion side of the transport path member 60, and the hook member 70(B) may be disposed on the front end portion side of the transport path member 60.

In the exemplary embodiment, the shape of the hook member 70(A) is different from the shape of the hook member 70(B), but the present invention is not limited thereto. For example, the hook member 70(A) and the hook member 70(B) may have the same shape.

In the exemplary embodiment, the image reading apparatus 20 includes two hook members 70, but the present invention is not limited thereto. For example, one or three or more hook members 70 may be included in the image reading apparatus 20.

In the exemplary embodiment, the tension coil spring 82 is used as an example of the elastic member, but the present invention is not limited thereto. As an example of the elastic member, for example, a push spring such as a compression coil spring that pushes the two hook members 70 in the hooking direction by an elastic force, or another spring may be used, and various members may be used.

In the exemplary embodiment, the tension coil spring 82 is disposed on the rear end portion side of the transport path member 60, but the present invention is not limited thereto. For example, the tension coil spring 82 may be disposed on the front end portion side of the transport path member 60. Further, the tension coil spring 82 may be disposed on both the rear end portion side and the front end portion side of the transport path member 60.

In the exemplary embodiment, as illustrated in FIGS. 8 to 10, the projection 68 that projects rearward from the transport path member 60 is provided at the lower end portion of the rear end portion of the transport path member 60, but the present invention is not limited thereto. For example, the image reading apparatus 20 may include the transport path member 60 in which the projection 68 is not provided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A transport apparatus comprising:
an apparatus body;
an opening and closing unit attached to the apparatus body so as to be openable and closable between a closed position where an upper surface of the apparatus body is covered and an open position where the upper surface of the apparatus body is exposed, the opening and closing unit including, inside the opening and closing unit, a transport path along which a target material is transported;
a transport path member that has a transport path surface constituting a part of the transport path, is rotatably supported by the opening and closing unit at one end portion side of the transport path member, and is configured such that the transport path is opened when the other end portion side of the transport path member moves downward from the opening and closing unit; and
a hook portion that is rotatably attached to the other end portion side of the transport path member, is configured to hold the transport path member in a closed state of the transport path, in a hooked state in which the hook portion is hooked on a hooked portion of the opening and closing unit, based on a force applied toward a first rotation direction along which the hook portion is hooked to the hooked portion, and is configured to rotate in a second rotation direction opposite to the first rotation direction by coming into contact with the hooked portion while the transport path member is pushed upward by the upper surface of the apparatus body when the opening and closing unit is moved from the open position to the closed position in a non-hooked state in which the hook portion is not hooked on the hooked portion, wherein the hook portion is configured such that, when the opening and closing unit is moved from the open position to the closed position, a tip portion of the hook portion is hooked on the hooked portion after the hook portion comes into contact with the hooked portion while the transport path member is pushed upward by the upper surface of the apparatus body and the hook portion is rotated in the second rotation direction, and the hook portion is configured such that, when the opening and closing unit is moved from the open position to the closed position, the hook portion is in the hooked state in which the hook portion is hooked on the hooked portion with rising of the transport path member by a force generated by the tip portion of the hook portion being hooked on the hooked portion in the closed position of the opening and closing unit after the hook portion comes into contact with the hooked portion while the transport path member is pushed upward by the upper surface of the apparatus body and the hook portion is rotated in the second rotation direction.

2. The transport apparatus according to claim 1, wherein the hook portion is configured such that a bottom surface of the hook portion that is in contact with the hooked portion in the hooked state in which the hook portion is hooked on the hooked portion is inclined with respect to the upper surface of the apparatus body so as to form an upslope toward the first rotation direction.

3. The transport apparatus according to claim 1, wherein the hook portion is provided on each of one end portion and the other end portion of the transport path member in a direction intersecting with a transport direction, each of the hook portions is fixed to a shaft extending along the direction intersecting with the transport direction, and a length of one of the hook portions from the shaft to a radially outermost portion is larger than a length of the other of the hook portions from the shaft to a radially outermost portion.

4. The transport apparatus according to claim 2, wherein the hook portion is provided on each of one end portion and the other end portion of the transport path member in a direction intersecting with a transport direction, each of the hook portions is fixed to a shaft extending along the direction intersecting with the transport direction, and a length of one of the hook portions from the shaft to a radially outermost portion is larger than a length of the other of the hook portions from the shaft to a radially outermost portion.

5. The transport apparatus according to claim 3, wherein one end portion of the opening and closing unit in a direction intersecting with a transport direction of the transport path is attached to the apparatus body so as to be openable and closable between the closed position and the open position, and the one of the hook portions is disposed on the other end portion of the transport path member in the direction intersecting with the transport direction.

6. The transport apparatus according to claim 4, wherein one end portion of the opening and closing unit in a direction intersecting with a transport direction of the transport path is attached to the apparatus body so as to be openable and closable between the closed position and the open position, and the one of the hook portions is disposed on the other end portion of the transport path member in the direction intersecting with the transport direction.

7. The transport apparatus according to claim 1, wherein one end portion of the opening and closing unit in a direction intersecting with a transport direction of the transport path is attached to the apparatus body so as to be openable and closable between the closed position and the open position, and an elastic member by which an elastic force is allowed to act on the hook portion is disposed on one end portion side of the transport path member in the direction intersecting with the transport direction.

8. The transport apparatus according to claim 1, wherein one end portion of the opening and closing unit in a direction intersecting with a transport direction of the transport path is attached to the apparatus body so as to be openable and closable between the closed position and the open position, an edge that protrudes from the upper surface of the apparatus body is formed on the apparatus body on one end portion side of the upper surface of the apparatus body in the direction intersecting with the transport direction, and a projection that projects from the transport path member in the direction intersecting with the transport direction and is configured to contact with the edge is provided on one end portion of the transport path member in the direction intersecting with the transport direction.

9. The transport apparatus according to claim 1, further comprising:

a reading unit that is provided in the apparatus body and is configured to read an image of a document as the target material to be transported along the transport path of the opening and closing unit when the opening and closing unit is in the closed position.

10. An image forming apparatus comprising:

the transport apparatus according to claim 9; and an image forming unit configured to form an image read by the reading unit on a recording medium.

* * * * *